United States Patent
Baik et al.

(10) Patent No.: US 9,995,902 B2
(45) Date of Patent: Jun. 12, 2018

(54) LENS ACTUATOR

(71) Applicant: SAMSUNG ELECTRO-MECHANICS CO., LTD., Suwon (KR)

(72) Inventors: Jae Ho Baik, Suwon (KR); Hoon Heo, Suwon (KR); Jung Seok Lee, Suwon (KR); Jae Hyuk Lee, Suwon (KR); Yong Joon Park, Suwon (KR); Jung Wook Hwang, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days. days.

(21) Appl. No.: 14/012,896

(22) Filed: Aug. 28, 2013

(65) Prior Publication Data

US 2014/0098434 A1 Apr. 10, 2014

(30) Foreign Application Priority Data

Oct. 10, 2012 (KR) .................. 10-2012-0112608

(51) Int. Cl.
*G02B 7/02* (2006.01)
*G02B 7/04* (2006.01)
*G02B 7/08* (2006.01)

(52) U.S. Cl.
CPC .............. *G02B 7/04* (2013.01); *G02B 7/08* (2013.01)

(58) Field of Classification Search
USPC .................. 359/811, 813, 815, 819–824
See application file for complete search history.

(56) References Cited

U.S. PATENT DOCUMENTS

| | | | |
|---|---|---|---|
| 6,990,727 B1 * | 1/2006 | Butler et al. | 29/603.03 |
| 2005/0036234 A1 * | 2/2005 | Takada et al. | 360/98.07 |
| 2008/0079829 A1 * | 4/2008 | Choi | H01L 27/14618 348/294 |
| 2008/0149366 A1 * | 6/2008 | Suzuki | G11B 7/0935 174/250 |
| 2009/0310959 A1 * | 12/2009 | Shih | G02B 7/08 396/529 |
| 2010/0052996 A1 * | 3/2010 | Ochi | G06K 19/07732 343/702 |
| 2010/0237718 A1 * | 9/2010 | Tsai | G02B 7/022 310/12.16 |

FOREIGN PATENT DOCUMENTS

| | | |
|---|---|---|
| CN | 1672225 | 9/2005 |
| JP | 2010-217857 A | 9/2010 |

(Continued)

OTHER PUBLICATIONS

Office Action dated May 29, 2014 for Chinese Patent Application No. 201310414959.5 and its English summary provided by Applicant's foreign counsel.

*Primary Examiner* — Brandi Thomas
(74) *Attorney, Agent, or Firm* — NSIP Law

(57) ABSTRACT

There is provided a lens actuator, including: a lens barrel in which at least one lens is provided on an optical axis; a magnetic part provided on one surface of the lens barrel; and a printed circuit board in which a coil pattern part generating electromagnetic force is provided, the printed circuit board having one surface facing the magnetic part, wherein magnetic material is provided on the other surface of the printed circuit board.

5 Claims, 2 Drawing Sheets

(56) References Cited

FOREIGN PATENT DOCUMENTS

| KR | 2009008545 | * | 8/2009 | ................ F24F 1/00 |
| KR | 10-2011-0008512 | | 1/2011 | |
| KR | 10-2011-0049241 A | | 5/2011 | |
| KR | 10-2011-0064147 A | | 6/2011 | |
| KR | 10-2012-0131051 | | 12/2012 | |
| WO | 2004/013876 | | 2/2004 | |

* cited by examiner

LENS ACTUATOR

CROSS-REFERENCE TO RELATED APPLICATIONS

This application claims the priority of Korean Patent Application No. 10-2012-0112608 filed on Oct. 10, 2012, in the Korean Intellectual Property Office, the disclosure of which is incorporated in its entirety herein by reference.

BACKGROUND OF THE INVENTION

Field of the Invention

The present invention relates to a lens actuator, and more particularly, to a lens actuator of which a manufacturing process is simplified and preventing foreign objects from being introduced thereto during the process.

Description of the Related Art

In general, it is common nowadays for mobile terminals such as mobile phones, PDAs, portable computers to not only transmit text messages and voice data but also image data.

Following this trend, recent mobile communications terminals are standardly equipped with camera modules and are able to transmit image data or allow users to make video calls.

In a camera module provided in a mobile communications terminal, a lens moving device is provided to allow for lens zooming or focusing by moving a lens in the optical direction.

The lens moving device may be divided into three types, i.e., a rotation motor type, a piezoelectric actuator (PZT) type, and a voice coil motor (VCM) type, following the manner in which driving force is generated.

The rotation motor type has a relatively complicated strctural mechanism, since it needs to convert rotary motion into linear motion. The PZT type is advantageous in that it is small and light but is disadvantageous in that it requires a high voltage power source.

The VCM type uses electromagnetic force between a coil through which current flows and the flux of a magnet to directly move a lens barrel having the coil or magnet attached thereto in the optical direction, and has advantages in that it has a simple structure and is operable at low voltage.

However, the existing lens actuator of VCM type requires separation space between a coil and a position sensor, and requires a separate process to electrically connect the coil and the position sensor to a printed circuit board, such that the process is complicated, and reliability is lowered if the assembly tolerance is large.

Further, foreign objects may be generated during soldering to contaminate the inside of the lens actuator, thereby lowering the reliability.

Patent Document 1 discloses a camera module having a structure in which an electromagnetic part and a hole sensor are mounted in a yoke.

RELATED ART DOCUMENT (Patent Document 1) Korean Patent Laid-Open Publication No. 2011-0064147

SUMMARY OF THE INVENTION

An aspect of the present invention provides a lens actuator having a simplified manufacturing process, reduced manufacturing costs, and preventing foreign objects from being introduced thereto during the manufacturing process by connecting a coil and circuit components to a printed circuit board without using wire bonding.

An aspect of the present invention also provides a lens actuator having a simplified manufacturing process due to a reduction in a number of components used therein by applying magnetic material to a printed circuit board without requiring a separate yoke member.

An aspect of the present invention also provides a lens actuator capable of being reduced in size by reducing separation space between a coil, circuit components and a yoke.

According to an aspect of the present invention, there is provided a lens actuator, including: a lens barrel in which at least one lens is provided on an optical axis; a magnetic part provided on one surface of the lens barrel; and a printed circuit board in which a coil pattern part generating electromagnetic force is provided, the printed circuit board having one surface facing the magnetic part, wherein magnetic material is provided on the other surface of the printed circuit board.

The coil pattern part may be a metal layer patterned on the printed circuit board.

The coil pattern part may be a winding coil embedded in the printed circuit board.

The printed circuit board may have an integrated circuit component mounted therein.

The printed circuit board may have a position sensor mounted therein to sense the position of the lens barrel.

The coil pattern part may surround the position sensor.

The magnetic material may be magnetic paste.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
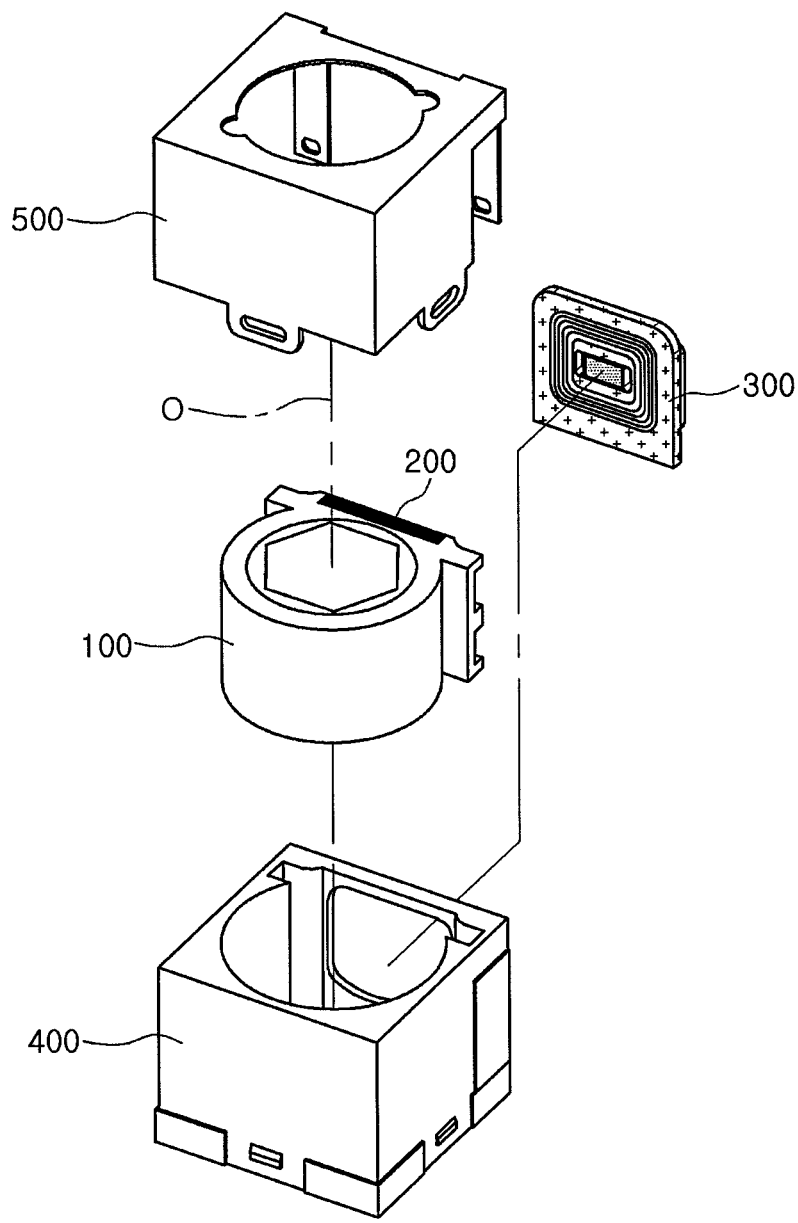
FIG. 1 is an exploded perspective view of a lens actuator according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Firstly, the term "optical axis direction" is defined as a vertical direction with respect to "O" shown in FIG. 1.

FIG. 1 is an exploded perspective view of a lens actuator according to an embodiment of the present invention.

Referring to FIG. 1, the lens actuator according to the embodiment of the present invention may include a lens barrel 100, a magnetic part 200, a printed circuit board 300, a housing 400 and a cover 500.

The lens barrel 100 is a hollow cylinder in which at least one lens may be provided on the optical axis.

The lens barrel 100 is coupled to the housing 400 so that it is movable on the optical axis, and the magnetic part 200 may be provided on a part of the surface of the lens barrel 100 as a driving unit for moving the lens barrel 100 in the optical direction.

By providing the magnetic part 200 on the part of the surface of the lens barrel 100, the lens barrel 100 can be moved in the optical direction by the interaction between a coil pattern part 310 provided on the printed circuit board 300 and the magnetic part 200.

That is, the magnetic part 200 generates a constant magnetic field, and electromagnetic interaction occurs between the magnetic part 200 and the coil pattern part 310 when the coil pattern part 310 is powered, such that the lens barrel 100 can be moved in the optical axis direction by Lorentz force generated in the vertical direction due to current and magnetic field.

Here, the shape of the magnetic part 200 is not specifically limited, as long as it is possible to move the lens barrel 100 in the optical axis direction by the electrical interaction with the coil pattern part 310.

The external power may be provided by the printed circuit board 300, specifically by the power connection terminal 340 of the printed circuit board 300.

The housing 400 is to support the lens, barrel 100, in which the lens barrel 100 is accommodated.

Accordingly, the housing 400 may have internal space to accommodate the lens barrel 100, and the shapes of the housing 400 and the internal space are not specifically limited.

The cover 500 may have a shape to cover the lens barrel 100 moving in the optical axis direction and the housing 400, and may be coupled to the housing 400.

The printed circuit board 300 may have the coil pattern part 310 and a position sensor 320 provided therein.

The detailed configuration of the printed circuit board 300 will be described in detail with reference to FIGS. 2 to 4.

The printed circuit board 300 may be coupled to the housing 400 so that its one surface faces the magnetic part 200.

Accordingly, the coil pattern part 310 provided on the printed circuit board 300 and the magnetic part 200 provided on the one surface of the lens barrel 100 may face and interact with each other to generate the Lorentz force.

After the lens barrel 100 and the printed circuit board 300 are coupled to the housing 400, the cover 500 is coupled therewith to protect the lens actuator from external impacts.

Figure 2:
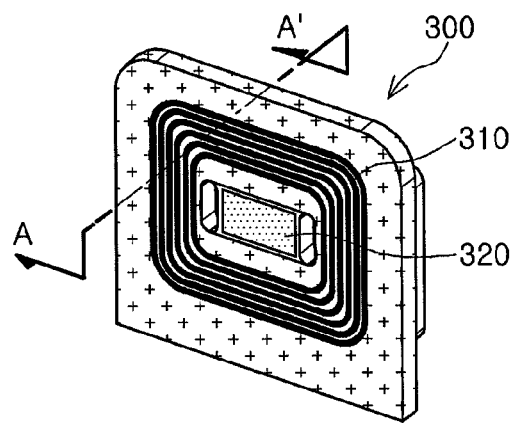
FIG. 2 is a perspective view of the front of a printed circuit board according to an embodiment of the present invention.

FIG. 2 is a perspective view of the front of a printed circuit board provided in a lens actuator, according to an embodiment of the present invention; FIG. 3 is a perspective view of the rear of a printed circuit board provided in a lens actuator, according to an embodiment of the present invention; and FIG. 4 is a cross-sectional view taken along line A-A' of FIG. 2.

Figure 3:
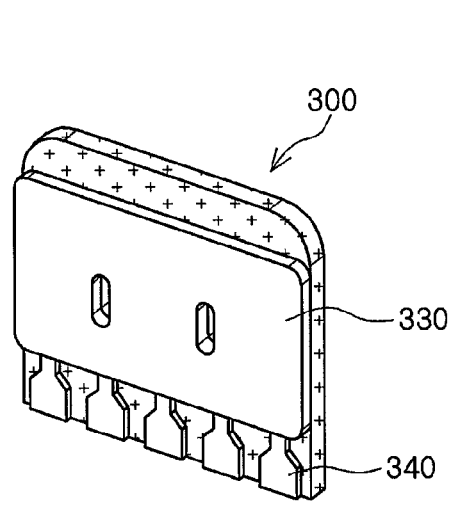
FIG. 3 is a perspective view of the rear of a printed circuit board according to an embodiment of the present invention.
Figure 4:
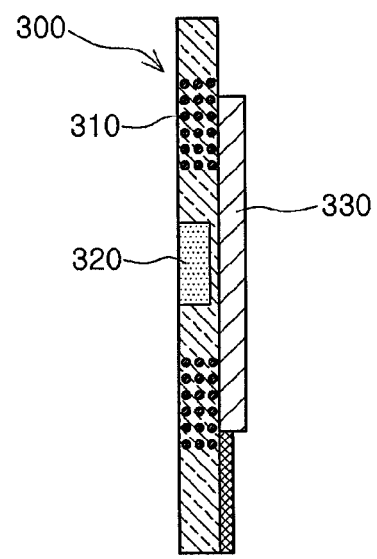
FIG. 4 is a cross-sectional view taken along line A-A' of FIG. 2.

Referring to FIGS. 2 to 4, the printed circuit board 300 provided in a lens actuator according to an embodiment may have a coil pattern part 310 and a position sensor 320 therein.

The coil pattern part 310 may be a winding coil pattern embedded in the printed circuit board 300 or may be a metal layer patterned in the printed circuit board 300.

Here, the coil pattern part 310 is formed in and electrically connected to the printed circuit board 300 internally, such that no separate wire bonding is required, thereby simplifying the manufacturing process.

Additionally, in case of wire bonding, foreign objects generated during the process may contaminate the inside of a lens actuator so that reliability may be lowered. However, in the case that the coil pattern part 310 and the printed circuit board 300 are electrically connected within the printed circuit board 300 as described above, the above problem can be avoided.

The coil pattern part 310 electrically connected to the printed circuit board 300 may generate electromagnetic force to move the lens barrel 100 upon receiving current from the printed circuit board 300.

In addition, the coil pattern part 310 may have an outer surface conforming to an outer surface of the magnetic part 200 provided on one surface of the lens barrel 100.

In the lens actuators according to the related art, instead of forming a coil pattern inside a printed circuit board, a coil separated from a printed circuit board is mounted on the upper surface of a printed circuit board, such that the winding shape of the coil cannot be freely chosen. In the coil pattern part 310 according to the embodiment of the present invention, however, the shape of the coil may be determined according to the shape of the magnetic part 200, thereby improving magnetic and spatial efficiency.

The location sensor 320 may be mounted in the printed circuit board 300.

Here, the position sensor 320 is mounted in and electrically connected to the printed circuit board 300 internally, such that no separate wire bonding is required. Accordingly, like the coil pattern part 310, the manufacturing process can be simplified and the reliability can be improved.

Further, by mounting the position sensor 320 in the printed circuit board 300, no separation space between the position sensor 320 in the housing 400 is required, such that the lens actuator can be reduced in size and manufacturing tolerance during the manufacturing process can be reduced.

The position sensor 320 senses a current position of the lens barrel 100 to provide it to a control unit (not shown), and the control unit (not shown) uses the information on the current position of the lens barrel 100 received from the position sensor 320 and information on a target position to which the lens barrel 100 is moved so as to apply an appropriate current to the coil pattern part 310, thereby controlling the movement of the lens barrel 100.

Although the position sensor 320 is mounted in the printed circuit board 300 in this embodiment, the present invention is not limited to the position sensor 320 but other circuit components may be mounted in the printed circuit board.

That is, as a driving chip for driving the lens actuator according to the embodiment of the present invention, an integrated circuit (IC) component may be mounted in the printed circuit board 300.

Since the integrated circuit (IC) component as well as the position sensor 320 may be mounted in the printed circuit board 300, the manufacturing process can be simplified.

One surface of the printed circuit board 300 may face the magnetic part 200, and magnetic material 330 may be provided on its other surface.

Specifically, the magnetic material 330 may be applied to the other surface of the printed circuit board 300, and may be magnetic paste. By applying the magnetic material 330 to the other surface of the printed circuit board 300, magnetic flux may smoothly flow to the magnetic part 200 through the coil pattern part 310.

Conventionally, a separate yoke member is prepared and is attached to a coil. However, according to the embodiment of the present invention in which the magnetic material 330 is applied to the other surface of the printed circuit board 300, components are reduced in number, thereby simplifying the process.

As in the above-described embodiment, by including the coil pattern part 310, the position sensor 320, the integrated circuit (IC) component and the magnetic material 330 in the printed circuit board 300, the manufacturing process can be simplified, manufacturing costs can be reduced and foreign objects generated by soldering and the like can be prevented.

In addition, since no separation space between the coil, the integrated circuit (IC) component and the yoke member is required, the lens actuator can be reduced in size.

As set forth above, according to embodiments of the present invention, the manufacturing process can be simplified, manufacturing costs can be reduced, and foreign objects can be prevented from being introduced during the process by way of connecting a coil and circuit components to a printed circuit board without using wire bonding.

Further, the manufacturing process can be simplified due to a reduction in a number of components by way of applying a magnetic material to a printed circuit board without requiring a separate yoke member.

Moreover, the lens actuator can be reduced in size byway of reducing separation space between a coil, circuit components and a magnetic material.

While the present invention has been shown and described in connection with the embodiments, it will be apparent to those skilled in the art that modifications and variations can be made without departing from the spirit and scope of the invention as defined by the appended claims.

What is claimed is:

1. A lens actuator, comprising:
   a lens barrel in which a lens is provided on an optical axis;
   a housing accommodating the lens barrel therein;
   a magnetic part moved, relative to the housing, in an optical axis direction together with the lens barrel;
   a printed circuit board coupled to the housing, and the printed circuit board comprising a coil pattern part to generate an electromagnetic force, wherein the coil pattern part faces the magnetic part; and
   a position sensor, embedded in the printed circuit board, to sense a position of the lens barrel,
   wherein a magnetic material is provided on a surface of the printed circuit board other than a surface of the printed circuit board on which the coil pattern part is formed.

2. The lens actuator of claim 1, wherein the coil pattern part comprises a metal layer patterned on the printed circuit board.

3. The lens actuator of claim 1, wherein the coil pattern part comprises a winding coil embedded in the printed circuit board.

4. The lens actuator of claim 1, wherein the printed circuit board has an integrated circuit component mounted therein or thereon.

5. The lens actuator of claim 1, wherein the magnetic material comprises a magnetic paste.

* * * * *